Oct. 3, 1967

C. P. GEEN 3,345,006

COLLET ASSEMBLY

Filed Sept. 2, 1965

INVENTOR:
CORY P. GEEN
BY Howson & Howson
ATTYS.

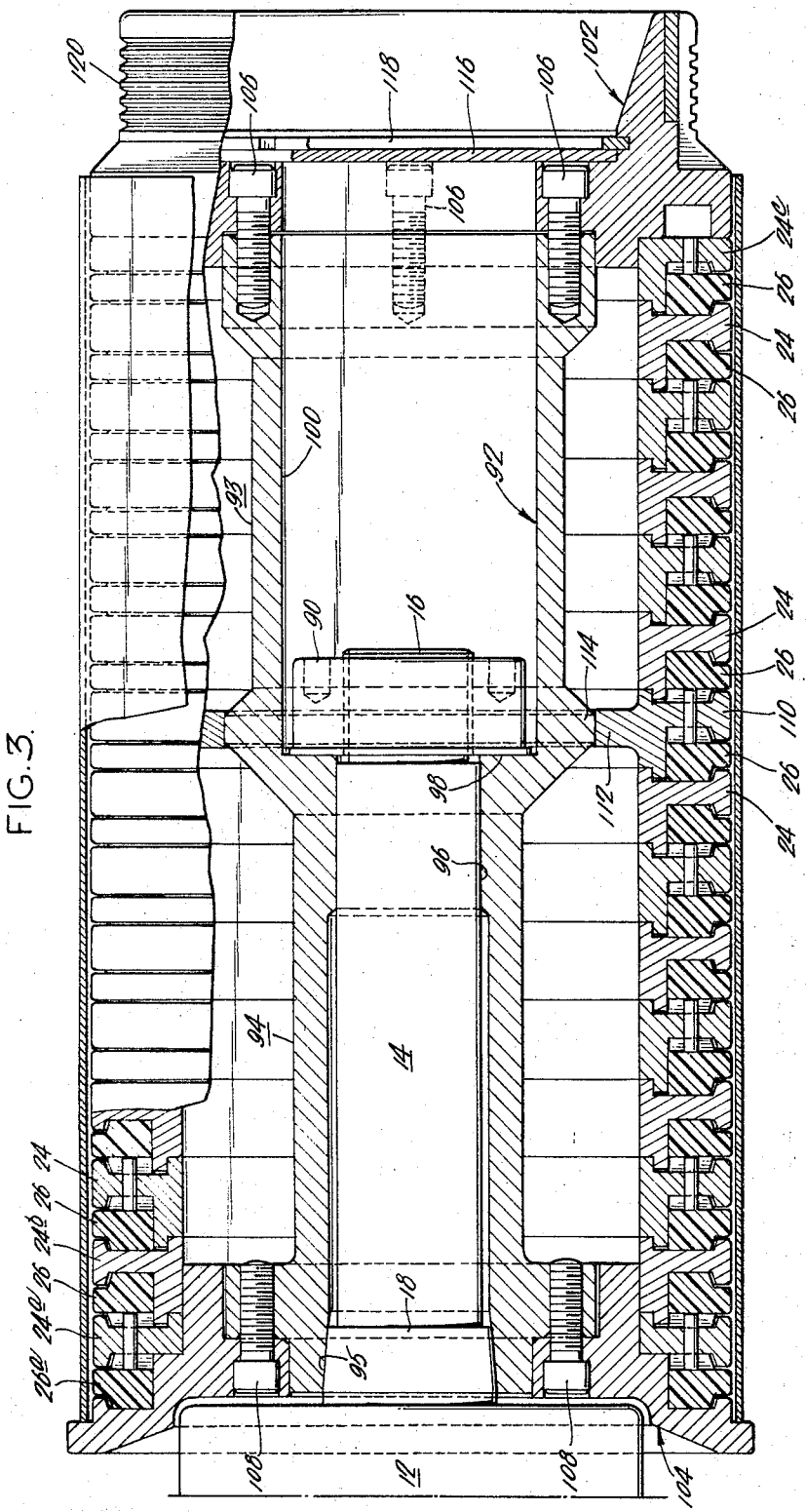

United States Patent Office 3,345,006
Patented Oct. 3, 1967

3,345,006
COLLET ASSEMBLY
Cory P. Geen, Philadelphia, Pa., assignor to Industrial Devices, Inc., Philadelphia, Pa., a corporation of Pennsylvania
Filed Sept. 2, 1965, Ser. No. 484,613
10 Claims. (Cl. 242—46.5)

ABSTRACT OF THE DISCLOSURE

A collet assembly for winding thread or fiber on cylindrical tubes and adapted for use with a selectively rotatable drive spindle, the assembly including annular radially expansible drive rings and annular drive ring spacers for positioning the drive rings in spaced aligned relation. The drive ring spacers are clamped between front and rear hubs on the spindle and include stepped complementary flange portions adapted to permit an interlocking of adjacent spacers to provide a rigid assembly.

---

The present invention relates generally to collet assemblies or expanding mandrels for rotatably driving cylindrical tubes for the winding of threads or fibers thereon and relates more particularly to a novel collet assembly for this purpose of a simplified, light weight, construction which may be safely operated at high speeds.

The collet of the present invention is particularly suited for the winding of glass fibers which, with modern techniques, may be drawn and wound at speeds as high as 12,000 r.p.m.'s on a 6″ diameter collet. A glass fiber package is formed by drawing a multiplicity of semimolten filaments through a bushing and combining the filaments into a strand which is wound on a cylindrical deformable tube. It is essential that a uniform strand speed be maintained and for this reason a precisely cylindrical winding surface must be provided. The collet assembly which is the subject of my U.S. Patent 3,099,411, issued July 30, 1963, provides the necessary accurate rounding of the deformable tube upon which the fibers are wound, and this assembly may be safely operated at extremely high rotational speeds for which conventional shoe-type collets are not suited.

The present collet assembly is an improvement on the assembly of the above-cited patent and in particular comprises an improved arrangement for mounting the drive ring spacers on the drive spindle. In the assembly illustrated in the patent, radially expansible annular drive rings are positioned between annular drive ring spacers, the rings and spacers providing a cylindrical surface adapted to receive a cylindrical tube on which the fibers are wound. The drive rings and spacers are mounted upon a thin-walled cylindrical collet tube which extends between inner and outer hubs on a conventional drive spindle. Although this construction provides a satisfactory collet operation, it is costly to manufacture primarily because of the accurate fitting required of the thin collet tubes and the drive ring spacers. A precise bore of each spacer is necessary and the entire cylindrical surface of the collet tube must be precision finished in addition to the interior of the tube ends which are fitted over the hubs. Furthermore, any eccentricity creates difficulties in balancing the assembly.

The present construction eliminates the need for a machined collet tube and includes a modification of the drive ring spacers wherein the inner axially extending portions of the spacers are stepped to permit the interengagement of adjoining spacers. The interengaged spacers thus form a rigid unit which is mounted directly on the front and rear hubs on the drive spindle. This stepped drive ring spacer arrangement is cheaper to construct and balance and is materially lighter than the collet tube structure. It is particularly adapted for providing a tube-receiving surface having a substantially greater axial length than the drive spindle.

It is accordingly a first object of the present invention to provide in a collet assembly of the type characterized by axially spaced, radially expansible, annular drive rings mounted between annular drive ring spacers, a novel, inexpensive and light weight arrangement for mounting the drive rings and spacers on a drive spindle.

A further object of the invention is to provide a novel mounting arrangement for the drive rings and spacers of a collet assembly of the type described which is adapted for providing a tube-receiving surface of a substantially greater axial length than the drive spindle upon which the rings and spacers are mounted.

An additional object of the invention is to provide a drive ring and spacer mounting arrangement of the type described which avoids the balancing difficulties characteristic of expanding shoe-type collet assemblies.

Additional objects and advantages of the invention will be more readily apparent from the following detailed description of embodiments thereof when taken together with the accompanying drawings wherein:

FIG. 3 is a sectional view showing a modified form of collet assembly in accordance with the invention wherein the collet extends axially substantially beyond the end of the drive spindle.

Figure 1:
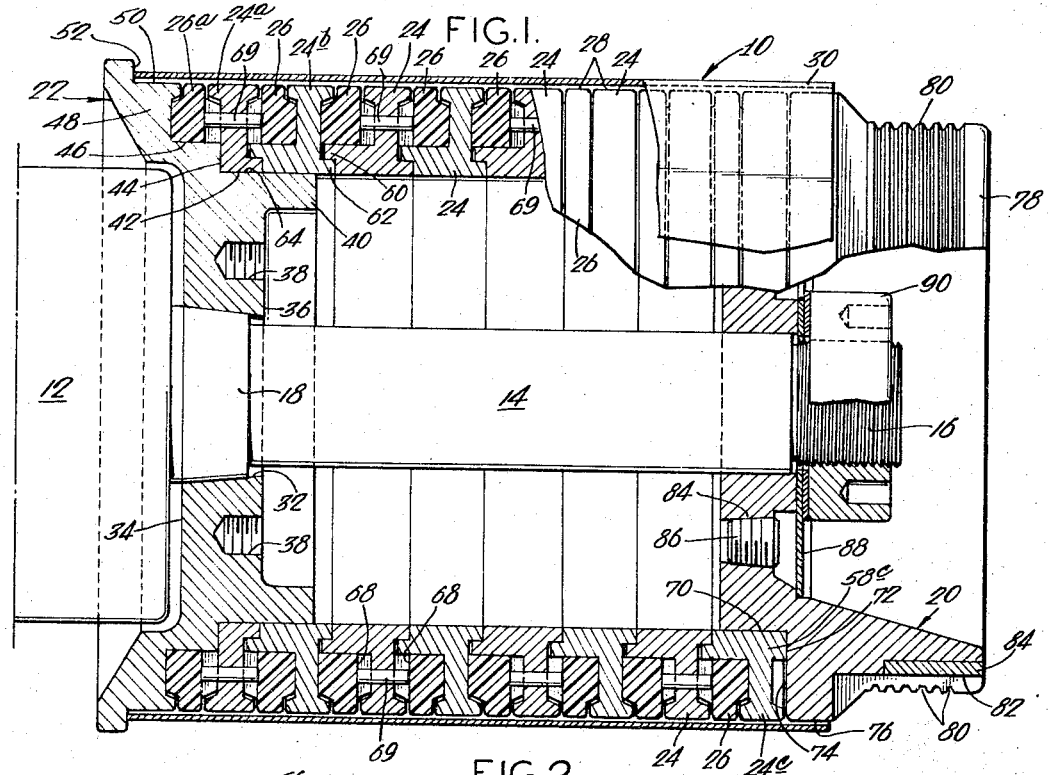
FIG. 1 is a sectional view showing a collet assembly mounted on a conventional drive spindle in accordance with the present invention.

Referring to the drawings, FIG. 1 shows a collet assembly 10 in accordance with the present invention mounted on a conventional drive spindle assembly 12 which includes a drive spindle 14 having a threaded outer end 16 and a tapered inner portion 18. The collet assembly 10 comprises front and rear hubs 20 and 22 mounted on the drive spindle between which are positioned a plurality of stepped drive ring spacers 24 securing the annular drive rings 26. The spacers 24 and drive rings 26 provide a cylindrical surface 28 on which the tube 30 is positioned for rotation by the drive spindle 14. The radial expansion of the drive rings 26 due to the centrifugal force thereon developed upon rotation of the drive spindle secures and accurately rounds the deformable tube 30 into a truly cylindrical winding surface.

Considering the specific details of the collet assembly, the annular rear hub 22 has a tapered bore 32 to permit seating of the hub on the tapered portion 18 of the drive spindle. The rear face 34 of the rear hub 22 is shaped to provide a clearance with respect to the housing of the drive spindle assembly. The front face 36 of the hub includes threaded diametrically opposed holes 38 which are used for removal of the hub from the spindle. A flange portion 40 on the front face 36 provides an extension of the cylindrical hub surface 42 upon which the rearmost spacers 24 are seated, the spacers abutting the hub shoulder 44. The rear hub includes an additional cylindrical surface 46 spaced outwardly of the shoulder 44 which is adapted to receive the rearmost drive ring 26a which is axially positioned by the radially extending portion 48 of the hub. A cylindrical surface 50 and shoulder 52 of the portion 48 serve respectively to receive and stop the winding tube 30.

Each of the drive ring spacers 24 includes a radially extending body portion 54, an outer flanged portion 56 and an inner stepped flanged portion 58 which includes the opposed steps 60 and 62 on opposite sides of the body portion 54. Although the flanged portion 58 in the illustrated embodiment extends predominantly on one side of each spacer ring for convenience in mounting the drive rings during assembling of the collet, this construction could of course be modified to provide substantially equal projections on each side of the spacer body portion 54.

As shown in FIG. 1, the assembled spacers are interconnected by means of the steps 60 and 62 which are precision fitted to permit a rigid interlocking thereof. The rearmost spacer 24a is modified in that the flange portion 58 extends only in a forward direction, the body portion 54 of the ring thus fitting snugly against the shoulder 44 of the rear hub 22 with the bore 64 of the spacer being fitted over the cylindrical surface 42 of the hub. The second spacer 24b is similarly precision fitted over the surface 42 of the hub with the step 60 thereof being engaged with the step 62 of the spacer 24a. The succeeding spacers 24 are maintained in alignment solely by means of the interlocking stepped flanged portions 58 thereof which are clamped together as described hereinafter.

Figure 2:
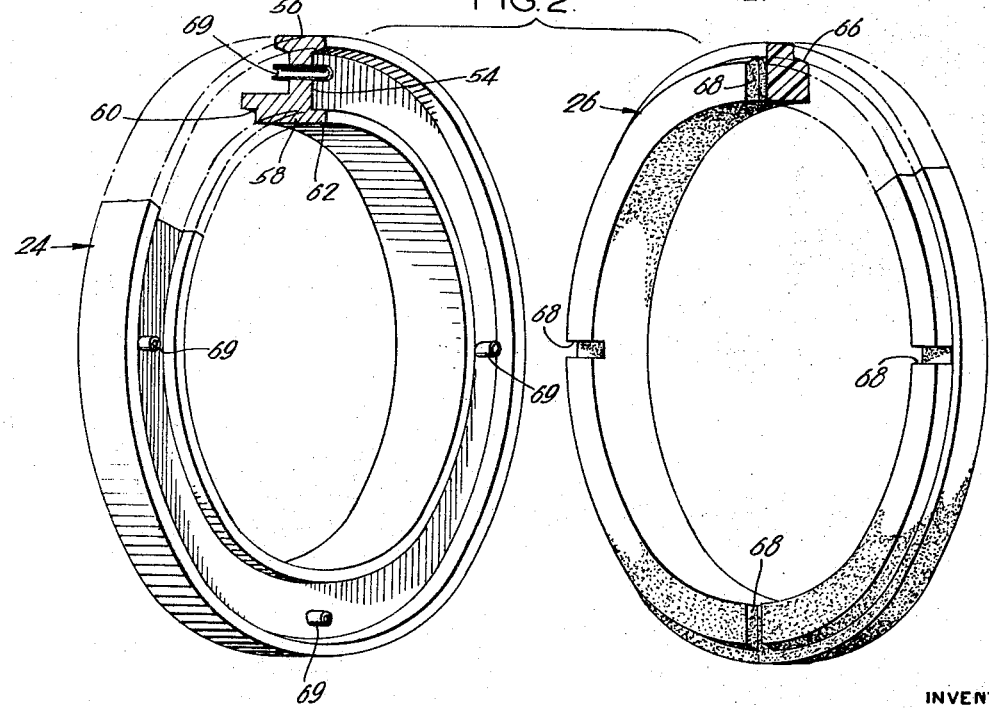
FIG. 2 is an exploded perspective view showing details of a drive ring and adjoining spacer of the assembly of FIG. 1.

The drive rings as shown in FIG. 2 are resilient rings having shoulder portions 66 on each side thereof which are adapted in conjunction with the outer flange portions 56 of the drive ring spacers to prevent undue radial expansion of the drive rings during operation of the collet. The drive rings include a plurality of spaced radial slots 68 in one shoulder 66 thereof which are adapted to receive the drive pins 69 extending axially from the body portions of alternate spacers, which pin and slot arrangement prevents rotation of the drive rings with respect to the spacers. The drive rings may be made from molded synthetic rubber or other suitable material.

The front hub 20 is mounted on the outer end of the drive spindle 14 and includes a cylindrical surface 70 upon which the outermost spacer 24c is accurately seated. The inner flange 58c of the spacer 24c is modified such that the forward edge 72 thereof is not stepped but abuts the radial shoulder surface 74 of the front hub. The outer cylindrical surface 76 of the hub is the same diameter as the outer surface of the spacers. The front hub extends axially beyond the drive spindle 14 in a nose portion 78 having a grooved cylindrical surface 80 of a smaller diameter than the surface 76 upon which "coarse" yarn is wound at the start of a package. Axial slots 82 extending across and interrupting the grooves 80 and provided with wear plates 84 permit the cutting and removal of the initial fiber windings from the nose.

The front hub includes openings 84 aligned with the holes 38 in the rear hub to permit access to the holes for removal of the assembly from the spindle. Plugs 86 are screwed into the openings 84 and a cover plate 88 is provided to seal the front face of the hub.

The assembly is secured to the drive spindle and the spacers maintained in interlocking engagement by the ring nut 90 which is screwed onto the threaded portion 16 of the drive spindle. The array of drive ring spacers is radially supported only at the ends thereof by the aligned cylindrical surfaces 42 and 70 respectively of the rear and front hubs. The stepped annular flanges of the drive rings are interlocked to form a rigid assembly clamped between the front and rear hubs which is not subject to deformation during rotation of the collet.

The operation of the present collet assembly is identical to that set forth in the above mentioned Patent 3,099,411 and very briefly is characterized upon rotation of the spindle by the expansion of the resilient annular drive rings 26 to grip and round out the deformable tube 30 upon which the fiber strand is wound. Upon completion of the winding of a fiber package, the collet is braked to a halt and the drive rings return to their initial position flush with or slightly below the spacers so that the package may be slid from the collet. The manner in which the strand is started on the tube by means of the grooved nose 78 is well known in the fiber winding art.

For mounting a collet of this type on proportionately longer spindles than that illustrated, it may be desirable to include one or more intermediate supporting spacers whcih extend inwardly to bear against the spindle and further insure against misalignment of the interlocking spacers.

As illustrated by the modified embodiment of FIG. 3, the present drive ring spacer mounting arrangement is particularly well adapted for mounting a collet assembly which extends substantially beyonud the end of the drive spindle. In this embodiment the collet spindle assembly 12 is identical with that shown in the embodiment of FIG. 1 and is provided with a collet body 92 which is a hollow axially extending element having front and rear portions 93 and 94, the rear portion in this instance including a tapered rear bore 95 adapted to engage the tapered surface 18 of the drive spindle and a cylindrical bore 96 adapted to engage the outer end of the spindle 14. The collet body includes a shoulder 98 adjacent the threaded end 16 of the spindle against which the ring nut 90 bears to secure the assembly to the spindle. The front portion 93 of the collet body extends axially beyond the end of the spindle and has a sufficiently large interior diameter 100 to permit passage of the nut 90.

Front and rear hubs 102 and 104 are respectively secured to the ends of the collet body 92 by bolts 106 and 108, the hubs providing shouldered surfaces for supporting the drive ring spacers 24 and drive rings 26 in the same manner as that illustrated in the embodiment of FIG. 1. An intermediate support spacer 110 is provided approximately midway along the array of spacers and includes a radially inwardly extending annular supporting rib 112 which is precisely fitted to engage an annular shoulder 114 of the collet body. The intermediate support spacer insures against misalignment of the extended spacer assembly. The front hub 102 includes a front closure 116 secured in place by snap ring 118 to cover the central bore thereof as well as the counterbored bolts 106. The nose 120 of the front hub 102 and other details of the assembly and its operation are, in all respects, similar to those of the previously described embodiment.

The advantages of the present collet construction can be readily appreciated when the fact is considered that a majority of existing spindle assemblies have a spindle length of only six or seven inches whereas there is an increasing demand for larger packages such as the 12 inch size. With the present invention, as illustrated by the FIG. 3 embodiment, the larger packages may be wound without difficulty on the shorter spindles.

Manifestly, changes in details of construction can be effected by those skilled in the art without departing from the spirit and the scope of the invention as defined in and limited solely by the appended claims.

I claim:

1. In a collet assembly for winding thread or fiber on cylindrical tubes and adapted for use with a selectively rotatable drive spindle, said assembly comprising annular radially expansible drive rings, annular drive ring spacers for positioning said drive rings in spaced aligned relation and means for mounting said drive ring spacers on the spindle, an improved mounting means for said drive ring spacers comprising front and rear hubs supported by the spindle, means on said front and rear hubs respectively for receiving the foremost and rearmost ones of said spacers, and stepped flanged portions on each of said spacers providing an interlocking of the spacers, and means for axially clamping said hubs to form a rigid aligned array of spacers between said hubs.

2. The invention as claimed in claim 1 wherein said means on said hubs for receiving ones of said spacers comprises cylindrical surfaces and shoulders on said hubs adapted to receive said spacers, said shoulders maintaining said spacers in clamped, interlocking relation.

3. The invention as claimed in claim 1 wherein the opposed axially-extending ends of said flanged portions have complementary stepped configurations.

4. The invention as claimed in claim 1 including in said array of spacers an intermediate spacer supported by the spindle.

5. The invention as claimed in claim 1 wherein said hubs are mounted on the ends of a hollow collet body, said collet body being secured to said drive spindle and extending substantially beyond the front end of said spindle.

6. The invention as claimed in claim 5 wherein said drive ring spacers are radially spaced from said collet body, and including an intermediate support spacer having a radially inwardly extending support rib engaging said collet body.

7. In a collet assembly for winding thread or fiber on cylindrical tubes and adapted for use with a selectively rotatable drive spindle, said assembly comprising annular radially expansible drive rings, annular drive ring spacers for positioning said drive rings in spaced aligned relation and means for mounting said drive ring spacers on the spindle, an improved mounting means for said drive ring spacers comprising front and rear hubs supported by the spindle, means on said front and rear hubs respectively for receiving the foremost and rearmost ones of said spacers, said latter means comprising cylindrical surfaces and shoulders on said hubs adapted to receive said spacers, and stepped flanged portions on each of said spacers, the opposed axially-extending ends of said flanged portions having complementary stepped configurations providing an interlocking of the spacers, and means for axially clamping said hubs to form a rigid aligned array of spacers between said hubs.

8. An annular drive ring spacer for a collet assembly for winding thread or fiber on cylindrical tubes, said assembly including annular radially expansible drive rings, and annular drive ring spacers for positioning said drive rings in spaced aligned relation, said drive ring spacer comprising an annular radially extending body portion, and an inner flanged portion, said inner flanged portion including step means arranged to permit the interlocking alignment of adjoining spacers to provide a rigid self-supported spacer assembly.

9. An annular drive ring spacer as claimed in claim 8, wherein said step means comprises a stepped configuration of each of the opposed axially extending ends of said flanged portion, the opposed ends having complementary stepped configurations.

10. An annular drive ring spacer as claimed in claim 9, including an outer flanged portion for controlling the expansion of the radially expansible drive ring.

References Cited
UNITED STATES PATENTS

| | | | |
|---|---|---|---|
| 2,830,821 | 4/1958 | Bystrom | 242—68.2 |
| 2,957,601 | 10/1960 | Novick | 220—97 |
| 3,099,411 | 7/1963 | Geen | 242—46.5 |

LEONARD D. CHRISTIAN, *Primary Examiner.*